United States Statutory Invention Registration [19]

[11] Reg. Number: H792

Sanval et al. [43] Published: Jun. 5, 1990

[54] MAINLOBE CANCELLER WITH MOTION COMPENSATION FOR USE WITH RADAR SYSTEMS

[75] Inventors: Probal K. Sanval; Richard M. Davis, both of Syracuse, N.Y.

[73] Assignee: The United States of America as represented by the Secretary of the Army, Washington, D.C.

[21] Appl. No.: 441,749

[22] Filed: Nov. 27, 1989

[51] Int. Cl.[5] ..... G01S 7/36

[52] U.S. Cl. ..... 342/17; 342/383; 342/384

*Primary Examiner*—Thomas H. Tarcza
*Assistant Examiner*—Linda J. Wallace
*Attorney, Agent, or Firm*—Fred M. Bush; Howard G. Garner

[57] ABSTRACT

This invention relates to a mainlobe jamming cancellation system which can be used to allow a radar to detect targets even when relative motion exists between the jammer and the radar platform. In particular, this invention relates to a mainlobe canceller that utilizes a main antenna and one or more widely spaced auxiliary antennas in conjunction with one or more phase locked loops (PLL), to automatically align the jamming signals received by the several antennas. The alignment is necessary to realize a high degree of jammer cancellation.

5 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MAINLOBE CANCELLER WITH MOTION COMPENSATION FOR USE WITH RADAR SYSTEMS

DEDICATORY CLAUSE

The invention described herein may be manufactured, used, and licensed by or for the Government for governmental purposes without the payment to us of any royalties thereon.

BACKGROUND OF THE INVENTION

This invention relates to a mainlobe jamming cancellation system which can be used to allow a radar to detect targets even when relative motion exists between the jammer and the radar platform. In particular, this invention relates to a mainlobe canceller that utilizes a main antenna and one or more widely spaced auxiliary antennas in conjunction with one or more phase locked loops (PLL), to automatically align the jamming signals received by the several antennas. The alignment is necessary to realize a high degree of jammer cancellation.

A radar system can be prevented from detecting a target by the use of jammers which raise the background noise level received by the radar. The noise level is increased sufficiently so that the radar cannot see or distinguish the reflection or echoes of the pulse reflected from the target. The radar system uses a main antenna to transmit and receive the radar pulse. This antenna has a mainlobe and sidelobes. The mainlobe has a narrow angular extent while the sidelobes cover the remainder of the hemisphere.

Interference jamming can come from sidelobe or from mainlobe directions. The jammer may be located on board an object accompanying a weapon carrying vehicle. For example, there may be two aircraft, one of which carries a weapon while the other carries a device used to generate the jamming signals. In the alternative, the jammer or the interfering signal could be mounted on a platform on the ground or it could be on a satellite platform in space. If the jammer is to jam the radar signal in the mainlobe its signal must be located within the appropriate narrow angular region. In fact, it must be sufficiently close to the radar target so that, when the radar signal illuminates the target, the jammer will also be within the mainlobe region of illumination. The angular extent of the mainlobe (half power points on the mainbeam) of the radar's antenna can be expressed as $\lambda/D$, where D is the diameter of the antenna and $\lambda$ is the wavelength at the center frequency within the radar's operating bandwidth. Thus, the separation between the jammer and the target must be less than $R\lambda/D$, where R is the range to the jammer, if the jammer and target are to simultaneously fall within the mainlobe.

SUMMARY OF INVENTION

It is an object of the invention to provide a mainlobe cancellation system which can remove mainlobe interference from a radar receiver when relative motion exists between the radar platform and the jamming sources, i.e. when the environment is nonstationary. The jamming signals received by the auxiliary antennas are multiplied by weights and are summed together. The weighted sum is then subtracted from the signal received by the main antenna to cancel or null the interfering signals. In order for the two signals to cancel each other they must be time-aligned. Time alignment can be obtained by inserting a bulk delay and a fine tuning delay in series with the main antenna. Fine tuning can be implemented, automatically, by using a tapped delay line with weights on the output taps. In general, one auxiliary antenna can null or cancel one narrowband interfering source. Using additional auxiliary antennas and additional weights allows the canceller to null or to cancel out additional narrowband jamming signals.

The amplitude of the jamming signals picked up by the auxiliary antennas must be as great or greater than the amplitude of the jamming signals received by the main antenna. This allows the magnitude of the weights to be less than unity, i.e. to say that the gain of the auxiliary antennas must be at least as great as the gain of the main antenna in the direction of the jamming signals. It is easy to satisfy this constraint if the jamming signal is received from the sidelobe directions in the main antenna. Since sidelobe gains are low, the gains of the auxiliary antennas can also be low. In other words, the auxiliary antennas can be small and inexpensive, at least they can be much smaller than the main antenna when the jamming signals are received from sidelobe directions.

The situation becomes much more difficult when the jamming signal is in the mainlobe of the main antenna. In this case, the auxiliary antennas must have high gain. In fact, they must have the same maximum gain as does the main antenna. In essence, the auxiliary antennas must be duplicates of the main antenna. Therefore, mainlobe cancellation is expensive and more difficult to implement than sidelobe cancellation. Mainlobe cancellation can be implemented in a defense system consisting of many large radars by simply designating one of the radar antennas to be the main antenna and then using the neighboring radar antennas as the auxiliaries. In this way, each radar antenna in the system can be "outfitted" with a mainlobe canceller.

Prior to enabling or activating a mainlobe canceller, the radar must first determine whether it is being jammed through the mainlobe. There are known ways to determine if the radar is being jammed through the mainlobe or through the sidelobes. Once the radar has determined that it is being mainlobe jammed, it calls upon one of its neighboring radars or antennas and asks it to point or steer its mainlobe in the direction of the jamming signal. Even if the main radar does not know the location of the jammer signal, it can direct its neighboring antenna to steer up its beam until it detects the presence of the jamming signal. The neighboring antenna then collects samples of the jamming waveform and relays these samples over a communication link to the main radar. The jammed main radar then multiplies the samples by an adaptively computed weight and subtracts them from the signal that is being received to cancel the mainlobe jamming signal.

The weights which multiply the jamming waveforms or signals received by the auxiliary antennas must be complex; that is, they must have amplitude and a phase. The amplitude is adjusted so that it makes up for the difference in amplitude between the levels of the jamming signals received in the main and auxiliary antennas. The phase is similarly set to make up for the difference in phase between the jamming signal received in the main antenna and that received in the auxiliary antennas. Errors within the system will limit the amount of cancellation that is achievable. Aside from errors, the canceller will work as long as the amplitude and phase of the jamming signals received by the two antennas do not change with time. Stated another way, the canceller will work as long as the environment is stationary.

A problem arises when the jamming signals (or one or both of the radar antennas are moving. If the jamming signal's origin moves too fast or in such a way that the relative phase between the samples received in the two sites change too rapidly with time, then the canceller will not be able to follow the changing phase. The canceller has a certain "response time" that is necessary to calculate or determine the appropriate amplitude and the phase of the weight.

This invention comprises means to enable the mainlobe canceller to automatically follow the changing phases between two or more antennas due to relative motion between the antennas or between the antennas and the target. This system requires a recognition that the changing phases are due to differences in Doppler that exists between the main and the auxiliary antennas. In other words, jamming signals received at the two antennas have slightly different center frequencies. Since the frequencies of these two signals are different, the phase between them will be constantly changing with time and the weight will not be able to follow the changing differential phase. The architecture of this device will also depend upon how many auxiliary antennas are utilized.

This invention has solved the problem identified in the preceding paragraphs by developing means to automatically measure the frequency differences and to automatically shift the frequency in one of the channels to make the frequencies identical. In order to measure the frequency difference, the inventors utilize a variant of a phase locked loop. The operation of the phase locked loops is well documented in the literature.

There are many algorithms which can be utilized to determine weights to be used by the canceller. The best known, and widely used algorithm is the "least mean square" (LMS) algorithm. As described in the publication "Adaptive Signal Processing", B. Widrow and S. D. Stearns, published in New York 1985 by Prentice Hall. The LMS algorithm successively updates the value of the weights until the jamming signal is nulled or cancelled. It is a gradient based algorithm. The next value of the weight is the previous value minus a constant times an estimate of the gradient of some cost functional. The cost functional is usually taken to be the output jamming power. When the gradient or derivative of the cost functional with respect to the weight, goes to zero, the updating stops and the weight has reached its steady-state value.

DETAILED DESCRIPTION OF THE DRAWINGS

Figure 1:
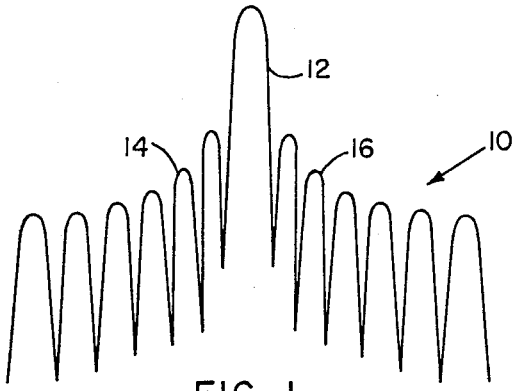
FIG. 1 is generic antenna pattern for a radar antenna.

Referring now to the FIG. 1 of the drawing which illustrates an angular cut (slice) through a generic antenna pattern 10 which has a mainlobe 12, and sidelobes (for example 14 and 16) surrounding the mainlobe. The mainlobe 12 has a narrow solid angular extent while sidelobes cover the remainder of a hemisphere.

Figure 2:
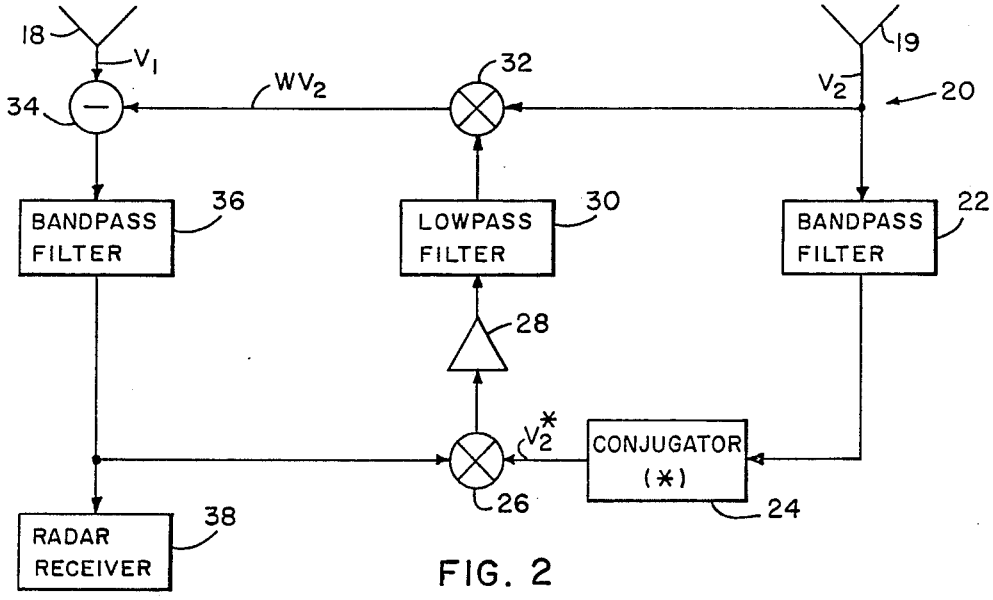
FIG. 2 is a schematic representation of a canceller system with a correlational feedback loop.

Referring now to the FIG. 2 of the drawing which illustrates a radar system with a correlation feedback loop. In this system, the weight is obtained by correlating the output error signal with the signal received from the auxiliary antenna 19. The circuitry illustrated in FIG. 2 automatically implements the LMS algorithm. The main antenna 18 receives the main signal $V_1$ which feeds into a cancellation node 34 where it is joined by a weighted signal $WV_2$ which is produced from signal $V_2$ received by the auxiliary antenna 19.

The canceller system of FIG. 2 includes a correlation feedback loop 20 which has a auxiliary bandpass filter 22, a conjugator 24, a multiplier 26, an amplifier 28, a lowpass filter 30, and a multiplier 32. Signal $V_2$ is fed into multiplier 32 directly as well as into the bandpass filter 22. The signal produced by the lowpass filter 30 is the weight which is the multiplier for signal $V_2$ at multiplier 32. The weighted signal $WV_2$ is merged with the signal $V_1$ at cancellation node 34 and then transmitted through a bandpass filter 36 which produces a residue signal. This residue signal is transmitted to radar receiver 38 and also to multiplier 26 where it is multiplied by the conjugated signal $V_2$ to adjust the weight for the multiplier 32.

The weight is obtained by correlating the output error from bandpass filter 36 with the conjugated signal received from the auxiliary antenna 19. This circuitry works well except when either the target or one or more of the antennas become nonstationary.

The following analysis assumes that the canceller of the radar system illustrated in FIG. 2 consists of only the main site antenna and a second auxiliary or remote site antenna.

The voltage signal received by the main antenna is $V_1$ and the voltage signal received by the auxiliary antenna is $V_2$. The corresponding powers of the signals in the two sites will be designated as $P_1$ and $P_2$, respectively. It is further assumed that there is only one interfering signal present and that it is moving. The two receiving sites are assumed to be stationary.

In addition to the interfering signal, there will also be thermal noise present in the receivers of the two sites. The analysis assumes that the thermal noise is much smaller than the interfering signal and, consequently, it has been deleted from the analysis. It is also assumed that the desired target return is not present while the value of the weight is being determined. In addition, the jammer is assumed to be continuously radiating (as opposed to pulsing on and off). Removing these assumptions would complicate the analysis, but would not change the conclusion or the functional form of the output of the analysis.

The signal received at the main site is assumed to be centered at a radian frequency of $\omega_o$. The signal in the main site is also assumed to be delayed from the signal received from the remote site by $\Delta t$ seconds. The signal received at the remote site is assumed to be shifted in frequency by an amount $\omega_d$ relative to the main site. More specifically, $\omega_d$ is equal to $\omega_o/C$ times the differential velocity $(d/dt)(R_1-R_2)$ between the two sites, where C is the speed of light in a vacuum and $R_1$ and $R_2$ are the ranges to the main and auxiliary antennas, respectively. The integrator in the correlator of the CFL is assumed to be implemented as a lowpass filter. The differential equation for the output (which is equal to the adaptive weight) of the filter is well known and can be expressed as:

$$T\frac{dW}{dt} + W = GrV_2^* \tag{1}$$

Substituting $V_1-WV_2$ for r and simplifying:

$$\tau\frac{dW}{dt} + W = \left(\frac{G}{1+G|V_2|^2}\right)V_1V_2^* \tag{2}$$

where:

$$V_1 = \text{complex envelope of baseband signal in Site \#1} = \sqrt{P_1}\ \exp(j\omega_o(t+\Delta t))$$

$$V_2 = \text{complex envelope of baseband signal in Site \#2} = \sqrt{P_2}\ \exp(j(\omega_o+\omega_d)t+\phi_0)$$

$\omega_o$=RF carrier (radian) frequency$=2\pi f_o$ $$\omega_d = \text{differential Doppler frequency} = 2\pi fo\frac{d}{dt}(R_1-R_2)/C$$

$\phi_o$=arbitrary phase $\Delta_t$=residual differential delay of the signal between the two sites $$\tau = \frac{T}{1+GP_2} = \text{closed loop time constant}$$

T=open loop time constant of filter. If the filter is a single pole RC circuit, then T equals $(RC)^{-1}$ Assuming $P_1$ equals $P_2$ equals P, and $\Delta t$ and $\phi_o$ are each zero, the differential equation for the weight can be rewritten as:

$$\tau\frac{dW}{dt} + W = \exp(-j\,\omega_d t) \tag{3}$$

Taking the Laplace transform and simplifying, we obtain:

$$W(S) = \frac{1}{(\tau S+1)(S+j\omega_d)} \tag{4}$$

where

S=$2\pi f$ f=frequency

The inverse transform then yields:

$$W(t)=a^{-1}(\exp(-j\omega_d t)-\exp(-t/\tau))\exp(j\theta) \tag{5}$$

where $a=[1+(\tau\omega_d)^2]^{\frac{1}{2}}$ and $\theta=\tan^{-1}(\tau\omega_d)$. The weight can be substituted into the equation for the output residue voltage to yield:

$$\begin{aligned} r(t) &= V_1 - WV_2 \\ &= \sqrt{2}\ [1 - a^{-1}(1-\exp(-t/\tau)\exp(j\,\omega_d t))\exp(j\theta)]\exp(j\omega_o\,t) \end{aligned} \tag{6}$$

The steady-state ($t\rightarrow\infty$) mean square output power can then readily be shown to equal:

$$|r|^2=P|1-a^{-}e^{j\theta}|^2=P(1+a^{-2}-2a-1\cos\theta) \tag{7}$$

Noting that $a=\sec\theta$:

$$|r|^2 = P\sin^2\theta = \frac{P\tau\omega_a}{1+(\tau\omega_d)^2} \tag{8}$$

Equation 8 shows that the steady state residue level depends upon the product of the closed-loop time constant of the feedback loop, multiplied by the differential Doppler shift ($\tau\omega_d$). The time constant is a measure of how fast the canceller can adapt to a changing environment, while the Doppler shift is a measure of how fast the environment is changing. The performance of the canceller depends upon their product. If the environment is stationary, then $\omega_d$ is zero and the steady-state residue will be zero, that is, the interference will be completely cancelled.

The constant T must be chosen to be long enough so that a good correlation can be obtained. A rule of thumb is to pick the closed loop time constant (and ipso facto, the value of T) to be equal to $10B^{-1}$ where B is the bandwidth over which it is desired to cancel the interference (the cancellation bandwidth). if, for example, the Doppler shift is 100 khz and B is 50 mhz, then $\tau\omega_d$ will be 0.13 and the steady-state residue will be P/8. This means that the interference will only be cancelled 9.0dB(10 Log 8).

Figure 3:
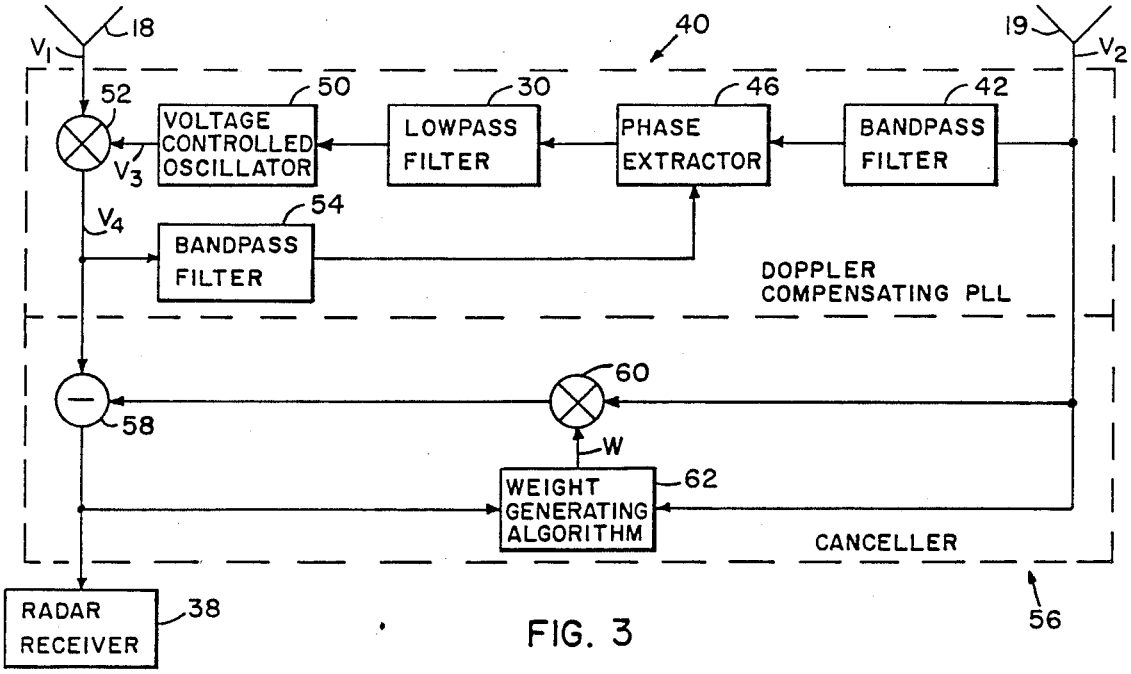
FIG. 3 is a schematic representation of a canceller motion compensating jammer nulling system which includes a doppler-compensating phase-locked loop in series with a canceller.

Doppler compensating phase locked loop 40, in series with the canceller is illustrated in FIG. 3. In this embodiment of the invention, main antenna 18 receives the main signal $V_1$ while auxiliary antenna 19 receives auxiliary signal $V_2$. Signal $V_2$ is transmitted to the weight generating algorithm 62 and bandpass filter 42, as well as to multiplier 60. The signal received by bandpass filter 42 is transmitted on to phase extractor 46, and thence, to lowpass filter 30 and the voltage control oscillator 50 which generates a signal $V_2$. Signal $V_2$ is transmitted to multiplier 52 where it is multiplied with signal $V_1$ to produce signal $V_4$. Signal $V_4$ is then transmitted to a bandpass filter 54 and thence to phase extractor 46 for correlation with the signal received from bandpass filter 42. Signal $V_4$ is also transmitted to cancellation node 58 in canceller 56. Signal $V_4$ is then transmitted to radar receiver 38 and to weight generating algorithm 62 to produce a weighted signal which is fed to multiplier 60. Signal $V_2$, which is received by multiplier 60, is multiplied by weight W and is then transmitted to cancellation node 58. The residue of the signal is then transmitted to radar receiver 38 and is comprised of the reflections from the target (the jamming signal having been removed).

Conceptually, the simplest way to remove the differential Doppler is to insert a circuit in front of the canceller circuitry that measures the difference in frequency between the two channels and then offsets the frequency in one of the channels to force it to be equal to the frequency in the other channel.

This invention uses a phase locked loop (PLL) (as shown in FIG. 3) to measure the differential Doppler and force the two channels to be aligned in frequency. The phase of the feedback signal $V_4$ is compared (in the phase extractor 46) with the phase of the signal $V_2$ received from the remote site. The lowpass filter (LPF) averages the phase difference. Since the derivative of the phase with respect to time equals frequency, the output of the LPF will be proportional to the difference between $\omega_d$ and the frequency of the feedback signal. The frequency out of the voltage controlled oscillator will equal the differential Doppler frequency when the error is zero. The voltage controlled oscillator output is used as the input to the mixer 52 to offset the signal being received in the main site.

Using the notation of the preceding analysis and assuming that $P_1$, equals $P_2$ equals P, $\Delta t$ equals zero, and $\phi_0$=zero.

$$V_1 = \sqrt{P}\ \exp(j\ \omega_o t) \tag{9}$$

$$V_2 = \sqrt{P}\ \exp(j(\omega_o + \omega_d)t) \tag{10}$$

Letting the output of the VCO be $$V_3 = A\ \exp(j\ \omega'_d\ t) \tag{11}$$

Then $$V_4 = \sqrt{P}\ A\ \exp(j(\omega_o + \omega'_d)t) \tag{12}$$

Assuming A=1

$$\phi_n = \int_o^t (\omega_d - \omega'_d)dt \tag{13}$$

and $$\phi'_n = \alpha\phi'_{n-1} + (1 - \alpha)\ \phi_n \tag{14}$$

where $\alpha$=smoothing constant of the lowpass filter.

The LPF averages the phase differences $\phi_n$. $\phi'$n is proportional to the average value of $(\omega_d - \omega'_d)$. The error signal ($\phi$n) will drive itself to zero as time progresses and $V_4$ will end up having the same center frequency as $V_2$.

Much exists in the prior art regarding the operation of PLLs. The application and configuration of the PPL in conjunction with a canceller, however, are novel. The PLL, shown in FIG. 3 could, of course, be flipped. The mixer could be placed in the auxiliary channel and the feedback could be taken from the output of the mixer in the auxiliary channel (in effect simply reversing the main and auxiliary antennas, leaving the rest of the Figure intact). The bandpass filter in the PLL will be narrowband. Its approximate center frequency can be estimated from the knowledge of the approximate speed and direction of the jamming signal.

A number of alternate configurations are possible if a correlation feedback loop is used to generate the adaptive weight.

Figure 4:
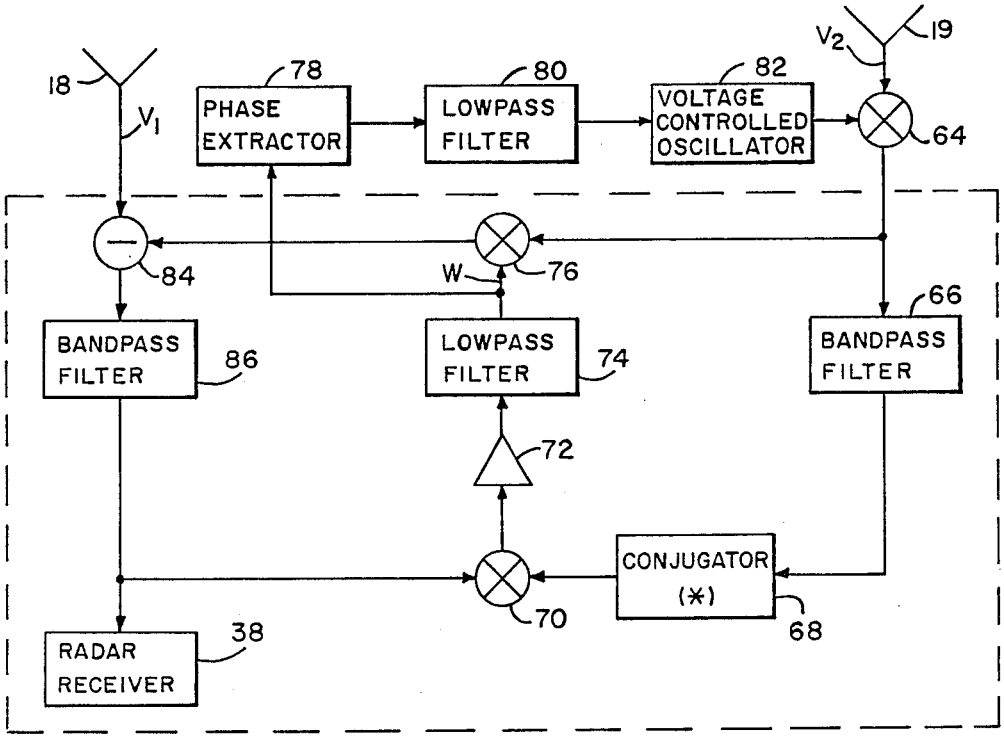
FIG. 4 is a schematic representation of a canceller system comprising a Doppler-compensating phase-locked loop combined with a correlation feedback loop.

In the embodiment illustrated in FIG. 4, the main antenna 18 receives a main signal $V_1$ while auxiliary antenna 19 receives an auxiliary signal $V_2$. Signal $V_2$ is fed into multiplier 64 and from thence to a multiplier 76 and to a bandpass filter 66. Signal $V_2$ is multiplied by multiplier 64 by the signal received from the voltage controlled oscillator 82. In this embodiment the signal $V_2$ received from multiplier 64 is again multiplied by multiplier 76 with weight W before being merged with signal $V_1$ at cancellation node 84. The signal leaving cancellation node 84 passes through bandpass filter 86 and thence to radar receiver 38 and to multiplier 70 where it is multiplied by signal $V_2$ received from conjugator 68. The multiplied signal at multiplier 70 is transmitted to amplifier 72 and thence to lowpass filter 74 to produce weight W. This signal is transmitted to multiplier 76, and also to phase extractor 78 and thence to lowpass filter 80 and voltage controlled oscillator 82 and from there to multiplier 64.

FIG. 4 shows a configuration in which the Doppler phase-locked loop has been inserted into the correlation feedback loop. The differential phase between the two channels (which is needed to determine the offset frequency for setting the voltage controlled oscillator) is obtained from the phase of the adaptive weight generated by the correlation feedback loop. The phase of the weight will be changing with time. The rate of change of phase with respect to time is the frequency and, in this case, the frequency will be equal to the required differential Doppler. The information about the difference in phase between the two channels is thus incorporated in the phase of the weight. Use of the weight to obtain the required information circumvents the need to compare the frequency of the feedback signal with that in the remote site antenna as was done in the series configuration shown in FIG. 3. The use of a correlation feedback loop combined with a phase-locked loop in this manner is unique and novel.

The mixer must be inserted into the auxiliary channel for the configuration shown in FIG. 4.

Figure 5:
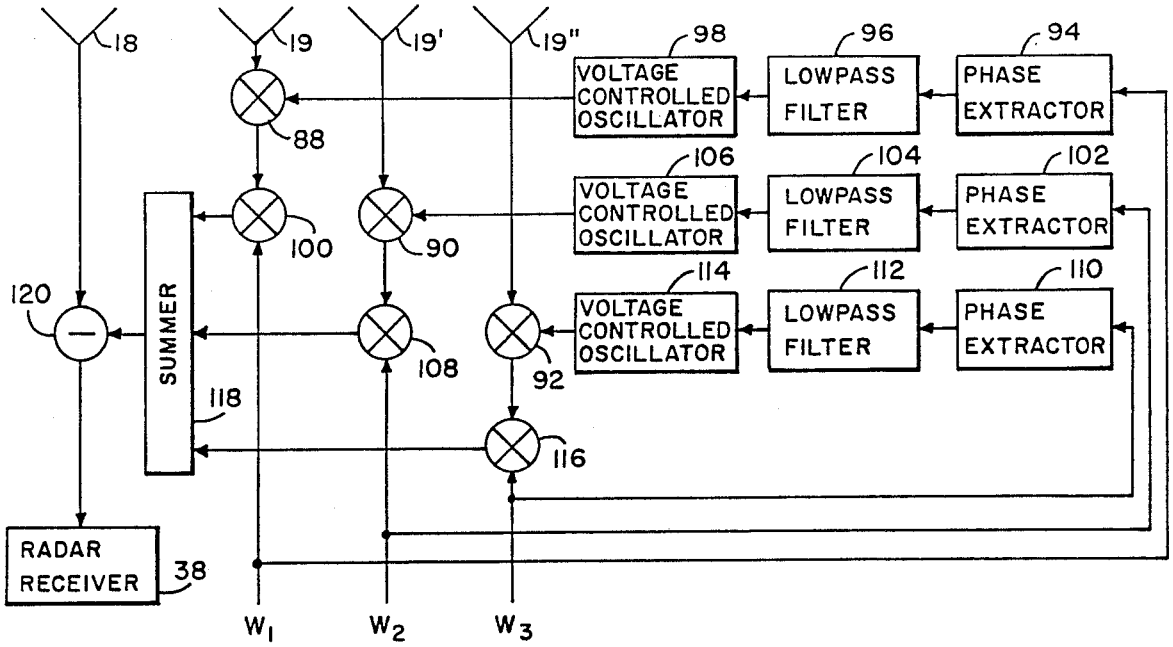
FIG. 5 is a schematic representation of a canceller system comprising multiple auxiliary antennas with motion compensation.

FIG. 5 show an extension of the configuration of FIG. 4 in which a number of additional auxiliary antennas or neighboring remote sites have been added to the canceller. The configuration shown in FIG. 5 would be capable of nulling multiple mainlobe jamming signals. A separate voltage controlled oscillator and mixer is required for each of the auxiliary antennas. In the embodiment illustrated in FIG. 5, main antenna 18 receives a main signal $V_1$ and a plurality of auxiliary antennas 19, and 19' and 19'' receive signals V2', V2'', and V2'', respectively. The signal ($V_2$) from auxiliary antenna 19 is transmitted to multiplier 88 where it is multiplied by a signal received from voltage controlled oscillator 98. The multiplied signal is then transmitted to multiplier 100 where it is multiplied by weight $W_1$, and then transmitted to summer 118. Weight $W_1$ is also transmitted to phase extractor 94, thence to lowpass filter 96, to voltage controlled oscillator 98, and from there, to multiplier 88 where it is multiplied by signal $V_2$.

Signal $V_2'$ is received from auxiliary antenna 19' and is transmitted to multiplier 90 where it is multiplied by a signal received from voltage controlled oscillator 106. The multiplied signal is then transmitted to a second multiplier 108 and from there to summer 118. Weight $W_2$ is transmitted to multiplier 108 where it is used to multiply the signal $V_2'$, received from multiplier 90 before it is transmitted to summer 118. Weight $W_2$ is also transmitted to phase extractor 102 and thence to lowpass filter 104 and voltage controlled oscillator 106 from which it is transmitted to multiplier 90. This signal is used to multiply signal $V_2'$.

A third signal $V_2''$ is received from auxiliary antenna 19'' and is transmitted to a multiplier 92 where it is multiplied by the signal received from voltage controlled oscillator 114, and then transmitted to multiplier 116 where it is multiplied by weight $W_3$, then transmitted to summer 118. Weight $W_3$ is also transmitted to phase extractor 110 and lowpass filter 112 and thence, to voltage controlled oscillator 114 where the resulting signal is used to multiply the signal $V_2''$. The signals received by summer 118 are summed and then transmitted to cancellation node 120 to cancel out the jamming signal, leaving only the target reflection signal. This signal or residue is transmitted to radar receiver 38. The configuration shown in FIG. 5 is capable of nulling multiple mainlobe jamming signals. A separate voltage controlled oscillator and mixer is required for each of the auxiliary antennas.

Figure 6:
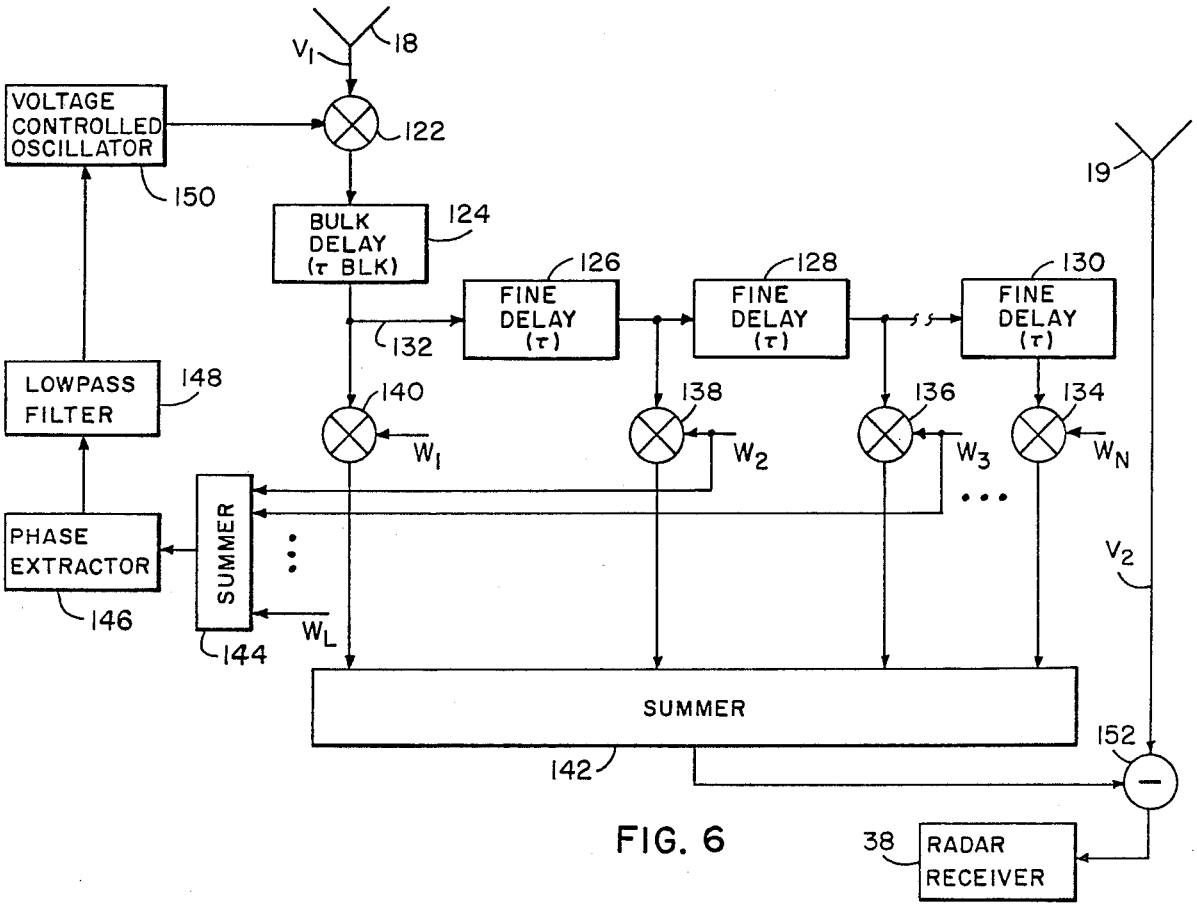
FIG. 6 is a schematic representation of an alternate canceller system comprising an adaptive transversal filter with motion compensation.

An alternative configuration that uses an adaptive transversal filter with a motion compensation canceller is illustrated in FIG. 6. This Figure illustrates the use of a single auxiliary antenna and the mixer is placed in the main channel as illustrated in FIG. 6. In this Figure main antenna 18 receives main signal $V_1$ and transmits it to multiplier 122 and thence to bulk delay device 124 which is used to bring the signals into coarse time alignment. The coarsely aligned signal is then transmitted through tapped delay line 132 with an adaptive weight on the output on each of the taps to effect a fine time alignment. In line 132 are fine time adjustment devices 126, 128 and 130 or one for each of the taps in the tapped delay line 132. The signal from device 126 is fed to multiplier 138 where it is multiplied by $W_2$ and then transmitted to the summer 142. The signal from fine delay device 126 is also transmitted to the fine delay device 128 and thence to multiplier 136 where it is multiplied by weight $W_3$ thence to summer 142. The signal in line 132 is also propagated down the delay line until it reaches fine delay device 130. After being delayed by the fine delay device 130, the signal goes to multiplier 134 where it is multiplied by weight $W_N$ and thence goes to summer 142. The values of a subset of the weights (for example $W_2, W_3, \ldots W_L$) are transmitted to summer 144 and thence to phase extractor 146. The signal from phase extractor 146 is transmitted to lowpass filter 148 and then to voltage controlled oscillator 150 and back to multiplier 122 where it is used to multiply signal $V_1$ received from the main antenna 18.

Signal $V_2$ from auxiliary antenna 19 is transmitted to cancellation node 152 where it is merged with the signal received from summer 142 to produce the residue signal which is equal to the signal reflected by the target after the jamming signal has been subtracted or removed therefrom. This signal is transmitted to radar receiver 38.

The offset frequency (Doppler) can be obtained by using the configuration of FIG. 6 by first summing the weight of the outputs of each of the taps. The changing phase on the composite (summation) can then be used to adjust the voltage controlled oscillator to the required Doppler frequency. This circuit, in effect, produces a weighted average of the phases of the adaptive weights on the taps. Those taps whose weights have small magnitudes will be weighted less than those that are time aligned and have large magnitudes. Referring to FIG. 6, the phase extracted from the weights is $$\theta_n = \tan^{-1}\left[\left(\sum_{i=1}^{J} I_m(W_i)\right) / \left(\sum_{i=1}^{J} Re(W_i)\right)\right] \tag{15}$$

where $Re(W_i)I_m(W_i)$=Real and Imaginary Parts of weight i. The output of the lowpass filter will then be given by $$\theta'_n = \alpha\theta'_{n-1} + (1-\alpha)\theta_n \tag{16}$$

where $\alpha$=smoothing constant

As long as there is a difference between the center frequency of the two input channels, the phase-difference ($\theta_n$) will be nonzero and changing with time. The nonzero phase difference causes the voltage controlled oscillator to generate a frequency that attempts to offset the main channel input frequency in the direction which reduces the frequency difference. In the steady-state, the two frequencies will be equal (locked) and the phase difference will be just large enough to keep the voltage controlled oscillator producing the needed Doppler frequency.

Figure 7:
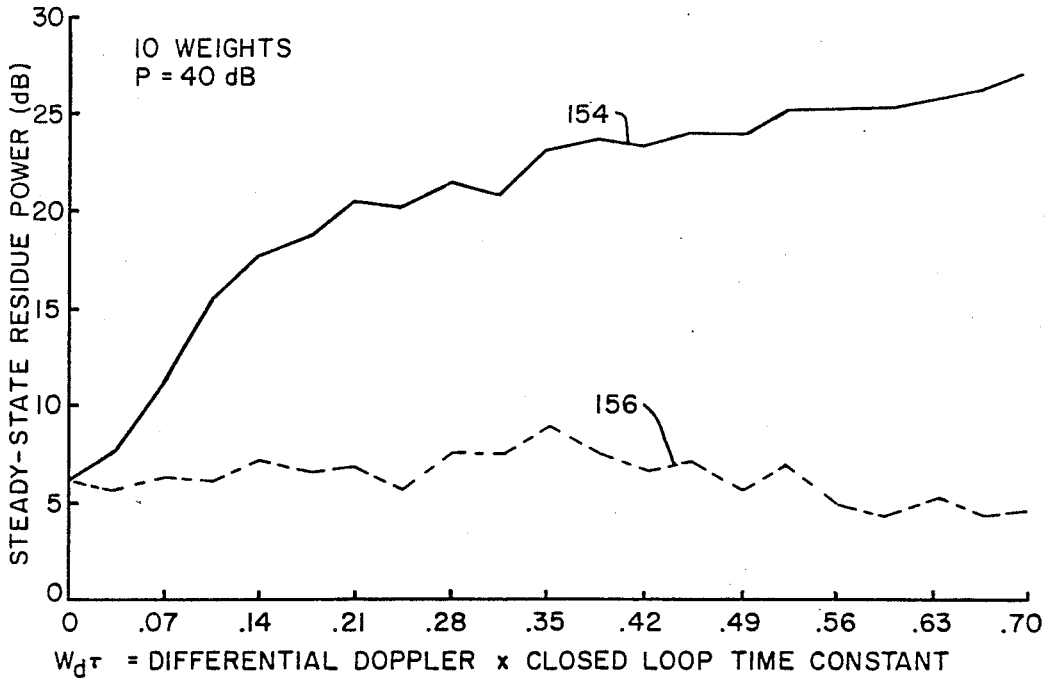
FIG. 7 is graphic representation of the steady-state performance versus a relative Doppler shift between a main antenna and an auxiliary antenna.

FIG. 7 shows a computer generated performance chart of the circuit presented in FIG. 6. In this embodiment, a single jamming signal is located in the space in front of two radar antennas. The two antennas are fixed and the jammer is moved to create a differential Doppler. FIG. 7 plots the cancellation performance (residue power before and after cancellation) versus the Doppler shift between the two antennas for the conditions shown. Only the weights on the center five taps on the tapped delay line were summed to obtain the differential phase used to set the voltage controlled oscillator. The effectiveness of the combined processor is demonstrated by the predicted improvement in cancellation performance.

While a number of embodiments and architectures have been illustrated hereinabove, it will be understood that numerous configurations and architectures can be devised which will utilize the essentials of the invention without departing from scope of the claims appended hereto.

We claim:

1. A mainlobe jamming cancellation system for removing mainlobe interference signals in radar systems when relative motion exists between the sources of said interference signals and the receiving antennas, comprising:

(a) a main antenna for broadcasting and receiving radio signals;

(b) at least one auxiliary antenna spaced from said main antenna for receiving said interfering signals;

(c) means for multiplying, weighting, and summing said interference signals received by said at least one auxiliary antenna;

(d) means for aligning the frequencies of said multiplied and weighted signals with the frequency of the radio signals received by said main antenna;

(e) means for time-aligning the signals received by said main and auxiliary antennas;

(f) canceller means for subtracting said time-aligned signals from said signals received by said main antenna; and (g) receiver means for receiving the residue of said main antenna signals for detecting a target.

2. A mainlobe jamming cancellation system as set forth in claim 1, wherein said means for aligning the frequencies comprises a phase locked loop circuit for aligning the frequencies of the signals received from said main and auxiliary antennas, in series with a canceller.

3. A mainlobe jamming cancellation system as set forth in claim 1, wherein said means for aligning the frequencies comprises a phase locked loop circuit intergrated with the circuitry of a canceller for extracting phase information needed to align said frequencies from a weight computed by said canceller.

4. A mainlobe jamming cancellation system as set forth in claim 3, which includes a plurality of auxiliary antennas, each of which has a phase locked loop circuit for frequency alignment integrated with the circuitry of its own canceller and its own weighting circuit for cancelling multiple mainlobe jamming signals.

5. A mainlobe jamming cancellation system as set forth in claim 3, which includes an adaptive transversal filter for automatic time alignment of wideband jamming signals wherein phase information is extracted from a subset of adaptively computed tapweights to perform frequency alignment for motion compensation.

* * * * *